FITCH RAYMOND AND AUGUST MILLER, OF CLEVELAND, OHIO.

Letters Patent No. 83,408, dated October 27, 1868.

IMPROVED COMPOUND FOR PRESERVING CHEESE.

The Schedule referred to in these Letters Patent and making part of the same.

*To all whom it may concern:*

Be it known that we, FITCH RAYMOND and AUGUST MILLER, of Cleveland, in the county of Cuyahoga, and State of Ohio, have invented certain new and useful Improvements in a Disinfecting-Compound for the Preservation of Cheese; and we do hereby declare that the following is a full and complete description of the same.

The nature of our invention relates to a disinfective compound to be applied to the affected part of the cheese, thereby destroying all the grubs or skippers that may be therein, and to prevent the fly from depositing the eggs of the skipper or grub without injuring the qualities of the cheese.

It is well known that in the manufacture of cheese a great deal of loss is occasioned by a fly, which, after the cheese is taken from the press and exposed to the air for drying, deposits its eggs in some parts, which produce what are called skippers, which soon work through the cheese, and render it perfectly useless in dairies, store-houses, and factories. The loss occasioned by this insect is sometimes very great, as the cheese must necessarily be exposed to the air in order to dry, to prevent it from moulding, and thus the fly has free access to it. In order to keep the fly from it, the cheese must be enclosed, and this, when the cheese is new, does not allow it to dry, and it is thus injured by becoming mouldy; but when it becomes dry, and the rind is hard, it is not liable to be pierced by the fly, and therefore there is less danger from it.

This compound is composed of equal parts of sulphuric acid and nitro-muriatic acid, or their chemical equivalents, combined together and applied to the affected part of the cheese. This does not detract from the flavor or qualities of the cheese, or injure its color, and the fly will not again deposit its eggs where the liquid has been applied. A small quantity diluted with water, or two or three drops of the compound, are sufficient for one application.

We do not confine ourselves to the proportions herein specified, but alter or modify the same to produce the desired results.

What we claim as our improvement, and desire to secure by Letters Patent, is—

The herein-described compound for the purpose set forth.

F. RAYMOND.
AUGUST MILLER.

Witnesses:
  FRANK S. ALDEN,
  E. E. WAITE.